J. GREENHALGH, Sr.
Tea Kettle.
No. 17,087.
Patented April 21, 1857.
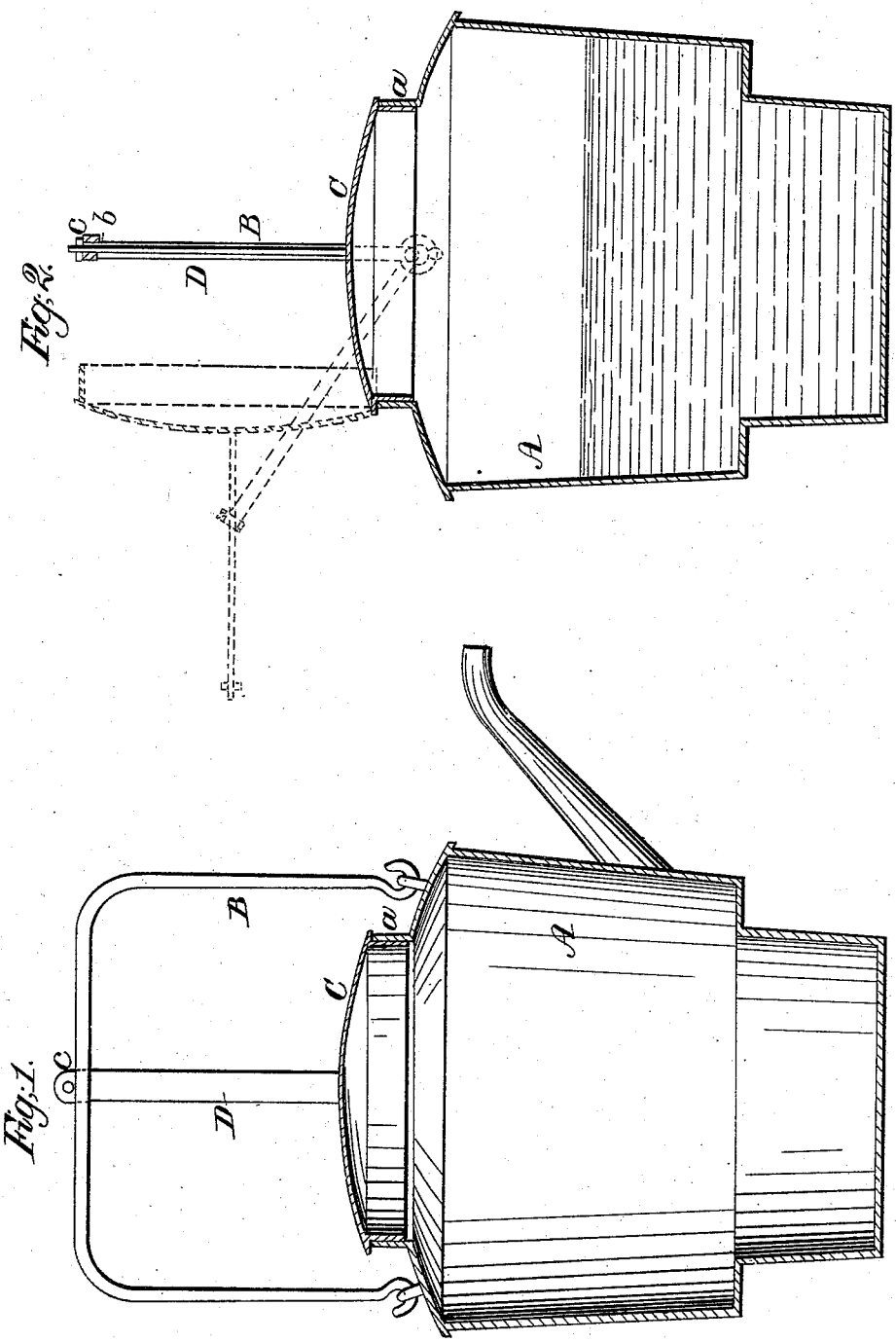

UNITED STATES PATENT OFFICE.

JAMES GREENHALGH, SR., OF WATERFORD, MASSACHUSETTS.

TEA-KETTLE, &c.

Specification of Letters Patent No. 17,087, dated April 21, 1857.

*To all whom it may concern:*

Be it known that I, JAMES GREENHALGH, Sr., of Waterford (Blackstone post-office,) in the county of Worcester and State of Massachusetts, have invented a new and useful Improvement in Tea-Kettles and other Similar Vessels Which Are Provided with Covers; and I do hereby declare that the following is a full, clear, and exact description of the same, reference being had to the annexed drawings, making a part of this specification, in which—

Figures 1 and 2, are vertical sections of a tea-kettle with my improvement applied to it, the two planes of section crossing each other at right angles.

Similar letters of reference indicate corresponding parts in the two figures.

My invention consists in connecting the cover of the kettle with the handle or bail, as will be hereinafter described, whereby the cover when adjusted over the top of the kettle will keep the handle or bail elevated, and when the handle or bail is moved to one side, the cover will be raised.

By this improvement the cover may be raised from and also adjusted over the top of the kettle and the bail also grasped by the hand without danger of burning the hand, and the cover is also kept in proper position or prevented from falling from the kettle when the kettle is tipped or inclined.

To enable those skilled in the art to fully understand and construct my invention, I will proceed to describe it.

A, represents a tea-kettle of the usual construction and B, is the bail or handle attached to the kettle in the usual way, so that it may swing to either side. C, is the cover which is also of the usual construction and fitted within a flanch *a,* around the orifice at the top of the kettle, the same as those in common use. To the cover C, at about its center a bar D, is attached—the bar being attached at right angles with the cover. The bar D, passes through a slot *b,* at the center of the bail or handle B, and a pin *c,* is placed in the upper part of the bar D, the pin being above or at the outer side of the bail or handle B.

From the above description of parts it will be seen that the cover C, when fitted within the flanch *a,* will keep the bail or handle B, in a vertical position and it will also be seen that if the bail or handle B, be moved to either side the cover C, will be raised, as shown in red, Fig. 2.

The advantage of the improvement is that the bail or handle B, is not allowed at any time to contact with the kettle and consequenly it cannot become heated and may be grasped by the hand and the cover raised or lowered with the greatest facility. The cover does not require to be handled at all, and is prevented from falling from the kettle when the kettle is tipped or inclined.

I do not claim having a wire pass from the top of the cover through the handle of a culinary vessel so that pulling the wire the cover may be raised without burning the hand. Neither do a claim a sliding stop arranged on the bail and acting in combination with a peculiar construction of eye for keeping the bail of a culinary vessel elevated—as in the patent of Thos. H. Dodge—1853.

Having thus described my invention, what I claim as new and desire to secure by Letters Patent, is:

Connecting the cover C, with the bail or handle B by means of the bar D, passing through a slot *b,* in the bail or handle, substantially as shown, for the purpose specified.

JAMES GREENHALGH. Senr.

Witnesses:
 S. A. BURGESS,
 G. M. BURGESS.